United States Patent [19]
Wörwag

[11] Patent Number: 5,551,119
[45] Date of Patent: Sep. 3, 1996

[54] VACUUM CLEANING TOOL WITH ELECTRICALLY DRIVEN BRUSH ROLLER

[75] Inventor: Peter Wörwag, Romanshorn, Switzerland

[73] Assignee: Firma Fedag, Romanshorn, Switzerland

[21] Appl. No.: 169,376

[22] Filed: Dec. 17, 1993

[30] Foreign Application Priority Data

Dec. 19, 1992 [DE] Germany ............................ 9217416 U
Feb. 20, 1993 [DE] Germany ............................ 43 05 262.2

[51] Int. Cl.[6] .................................................. A47L 9/28
[52] U.S. Cl. ................................................. 15/319; 15/339
[58] Field of Search ...................................... 15/319, 339

[56] References Cited

FOREIGN PATENT DOCUMENTS

| | | | |
|---|---|---|---|
| 259434 | 9/1992 | Japan | 15/319 |
| 279129 | 10/1992 | Japan | 15/319 |
| 327821 | 11/1992 | Japan | 15/319 |
| 327820 | 11/1992 | Japan | 15/319 |
| 146386 | 6/1993 | Japan | 15/319 |

*Primary Examiner*—Chris K. Moore
*Attorney, Agent, or Firm*—Robert W. Becker & Associates

[57] ABSTRACT

A vacuum cleaning tool for connecting to a suction tube of a vacuum cleaning device according has a casing with a bottom plate facing a floor surface to be cleaned. A brush chamber is enclosed within the casing. A brush roller having bristles is rotatably supported within the brush chamber. An electric motor drives the brush roller. The bottom plate has a suction opening through which the bristles of the brush roller extend. A speed regulator is connected to the electric motor. A movement sensor for controlling the speed regulator is provided, wherein the electric motor is switched off by the speed regulator as a function of a signal emitted by the movement sensor. A first recognition circuit is connected between the movement sensor and the speed regulator.

9 Claims, 7 Drawing Sheets

VACUUM CLEANING TOOL WITH ELECTRICALLY DRIVEN BRUSH ROLLER

BACKGROUND OF THE INVENTION

The invention relates to a vacuum cleaning tool for connection to the suction pipe of a vacuum cleaner wherein a brush roller is rotatably supported in a brush chamber and driven by an electric motor, the bristles of the brush roller extending through a suction opening in a base plate of the cleaning tool that is opposite to the floor to be cleaned.

A cleaning tool of this type, also referred to as a brush suction nozzle, is used both for cleaning smooth, hard surfaces as well as for cleaning textile coverings, in particular floor coverings. When cleaning a textile floor covering, the brush roller rotates, for example, at a speed of approximately 3,600 rpm. If the cleaning tool is left stationary with the brush roller rotating, this may lead to considerable damage to a textile floor covering or to the vacuum cleaning tool itself.

It is therefore an object of the present invention to improve a vacuum cleaning tool of the aforementioned general type so that damage to a textile floor covering by an excessively long action time of the rotating brush roller is avoided.

SUMMARY OF THE INVENTION

The vacuum cleaning tool for connecting to a suction tube of a vacuum cleaning device according to the present invention is primarily characterized by:
- a casing with a bottom plate facing a floor surface to be cleaned;
- a brush chamber enclosed within the casing;
- a brush roller having bristles and being rotatably supported within the brush chamber;
- an electric motor for rotatably driving the brush roller;
- the bottom plate having a suction opening;
- the bristles of the brush roller extending through the suction opening;
- a speed regulator connected to the electric motor;
- a movement sensor for controlling the speed regulator, wherein the electric motor is switched off by the speed regulator as a function of a signal emitted by the movement sensor; and
- a first recognition circuit connected between the movement sensor and the speed regulator.

Preferably, the tool further comprises a position sensor and a second recognition circuit, the position sensor connected via the second recognition circuit to the speed regulator.

Advantageously, the movement sensor and the position sensor are electromechanical sensors.

Expediently, the electromechanical sensor is comprised of at least one electric contact switched by a movable inertia body. The electromechanical sensor expediently has a first guide path with two end sections for the inertia body. The at least one electric contact is arranged at one of the end section of the first guide path. The first guide path preferably is limited at the two end section by an end wall, and the electric contact is comprised of a contact pair having a first contact positioned within a guiding plane of the first guide path and a second contact positioned at the end wall of the first guide path. Preferably, the first guide path has one of the electric contact pairs arranged on each of the two end sections.

In a preferred embodiment of the present invention, the inertia body is electrically conductive and forms an electric connection between the first and the second contacts. Preferably, the first guide path is groove-shaped and the inertia body is a ball. Advantageously, the first guide path is V-shaped in cross-section with oppositely arranged, substantially planar sidewalls, wherein the first contact is comprised of two contact strips that are positioned opposite one another on the oppositely arranged sidewalls.

The first guide path preferably has a lower edge that is facing the bottom plate.

In another embodiment of the present invention, the tool further comprises: a timing circuit with a first capacitor, and a charge transfer circuit connected to the capacitor, wherein the contact pairs are components of the charge transfer circuit. The tool further comprises a charging capacitor, wherein the first capacitor is connected via a first contact pair to the charging capacitor, and wherein a second contact pair serves for connecting a power supply to the charging capacitor.

Advantageously, the inertia body is received in the first guide path. The first guide path expediently has a cover for covering the first guide path, wherein the cover has an inner surface with at least one contact. The cover expediently is an upper guide path having a cross-section identical to the first guide path. The at least one contact is a contact pair that forms the position sensor.

Preferably, the movement sensor is a noncontact sensor. Advantageously, the casing has casters and the movement sensor is in the form of one of the casters. The movement sensor for this purpose comprises a sensing element for sensing rotational movement of the caster. The sensing element preferably is a light barrier and the castor has a support disk with fields, wherein the light barrier cooperates with these fields. Preferably, the light barrier is a fork light barrier and the fields are perforations in the support disk.

In a preferred embodiment the movement sensor is a capacitive sensor.

In another preferred embodiment of the present invention the tool further comprises a third recognition circuit and a load sensor, wherein the speed regulator is connected via the third recognition circuit to the load sensor. Expediently, the load sensor is connected within a circuit of the electric motor and is in the form of a resistor.

In another embodiment of the present invention, the tool comprises a load sensor, wherein the load sensor and the position sensor are both connected to the second recognition circuit.

According to the present invention, during the forward and backward working movement of the vacuum cleaning tool, the movement sensor will emit a signal continuously; in the absence of a signal, the drive of the brush roller will be switched off by way of the recognition circuit. Thus, the danger of damaging a textile floor covering by parking the vacuum cleaner with the brush roller rotating is largely avoided.

In order to preclude injury to the operator by the rotating brush roller, it is suggested to connect the speed regulator furthermore by way of a further recognition circuit to a position sensor, so that in certain positions of the vacuum cleaning tool, the recognition circuit likewise stops the electric motor by way of the speed regulator.

In a preferred construction of the present invention, the position sensor and/or the movement sensor is formed by electrical contacts operated by a movable inertia body. These contacts are preferably located at the end regions of a guide path constructed for the inertia body, the conducting inertia body being able to form a bridge connecting the contacts electrically.

At both ends the guide path preferably comprises contact pairs, which consist of a contact located in the guide plane at the end of the guide path and a contact limiting the guide path on its end face. In the case of a reciprocating movement of the guide path aligned in the working direction, the inertia body will thus alternately close the contact pair at one end or at the other end of the guide path. The contact pairs may thus advantageously form part of a charge transfer circuit for the capacitor of a timing circuit, the capacitor of the timing circuit being connected by way of the first contact pair to a charging capacitor, to which a supply voltage may be applied by way of the second contact pair.

In a preferred embodiment of the invention, the guide path of the movement sensor is closed by a cover constructed as a second guide path, the cover-forming second guide path having the same cross-section as the lower first guide path. Located in the upper guide path is at least one pair of contacts, which is closed by the inertia body in the overhead position of the vacuum cleaning tool.

BRIEF DESCRIPTION OF THE DRAWINGS

Further features and advantages of the present invention will become apparent from the following specification and the accompanying drawings, in which.

DESCRIPTION OF PREFERRED EMBODIMENTS

Figure 1:
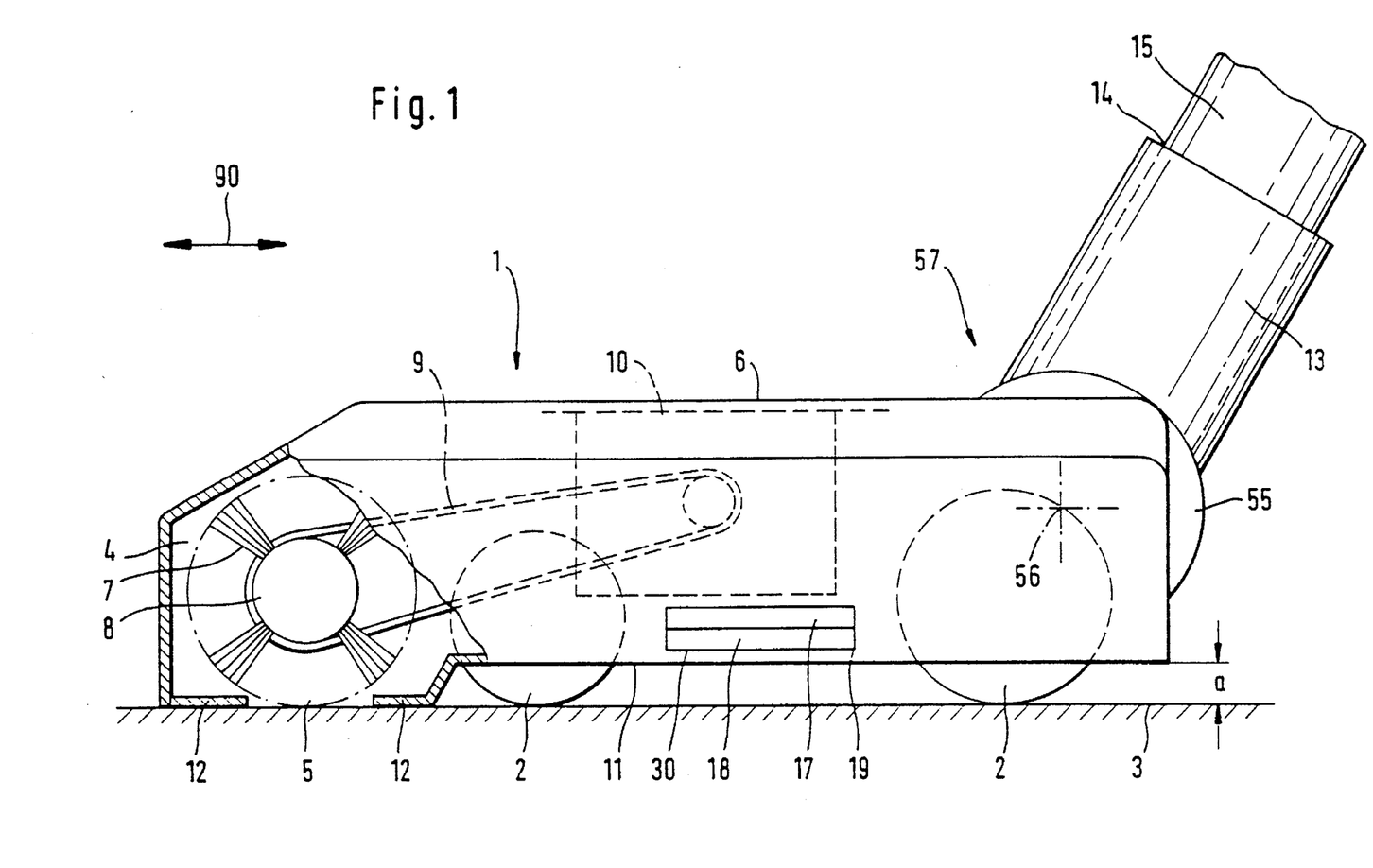
FIG. 1 shows in side view and in partial section a vacuum cleaning tool with brush roller for connection to a vacuum cleaner.

The cleaning tool illustrated in FIG. 1 is a so-called brush suction nozzle 1, having a casing 6 supported on casters 2 on the floor 3 to be cleaned. At one end the casing 6 is provided with a connection socket 13, which is mounted with a roller-shaped pivot head 55 in the casing 6 so as to be pivotable about a horizontal axis 56. Inserted in the receiving section 14 remote from the pivot joint 55 is a guide tube 15, which is connected to a vacuum cleaner by way of a suction line (not shown).

At the end opposite the pivot joint 57 of the connection socket 13, a brush chamber 4 is formed in the casing 6, which on its bottom facing the floor 3 and formed by a base plate 11 comprises a suction opening 5, which extends as a slot from one side face of the casing to the other transversely with respect to the working direction (double arrow 90). In the operating position of the brush suction nozzle 1, the base plate 11 of the casing 6, opposite the floor 3, in the region outside the brush chamber 4 is positioned at a distance a preferably parallel to the floor 3. Located above the suction opening 5 is a brush roller 8, whose bristles 7 project through the suction opening 5 so that the floor 3 can be brushed. Parallel to the suction opening 5 sliding strips 12 are positioned for delimiting the suction opening 5, which sliding strips rest on the floor 3 in the operating position of the brush suction nozzle 1. A suction air stream entering through the suction opening 5 is guided, in a manner which is not shown in detail, through the casing 6 to the pivot joint 57 and exits via the connection socket 13.

Located between the brush chamber 4 and the pivot joint 57 in the casing 6 is an electric motor 10, which is supplied with electric power with a cable (not shown in detail) preferably guided in the connection socket 13 and the suction tube. The electric motor 10 drives with a belt 9 the brush roller 8, rotatably mounted in the brush chamber 4, at a speed which can be preset. According to FIG. 2, the electric motor 10 is monitored by a control circuit, which cooperates preferably with an electromechanical movement sensor (switch) 18 and/or position sensor (switch) 17 located in the casing 6. FIG. 1 shows a combined position/movement sensor, which essentially has a parallelepiped-shaped outer casing 19 with a rectangular, in particular, square or diamond-shaped cross-section perpendicular to its longitudinal axis 20 (FIG. 3). In the embodiment according to FIGS. 3 and 4, the casing 19 is constructed with a square cross-section (FIG. 4), due to which a channel-like lower, V-shaped guide path 21 and a correspondingly constructed upper guide path 22 are formed. The guide paths are positioned with their openings facing each other, so that the upper guide path 22 closes off the lower guide path 21 as a cover. The lower edge 30 of the lower guide path 21 faces the base plate 11 (FIG. 1) or the floor 3 and in particular extends approximately parallel to the floor 3 and is aligned in the working direction (double arrow 90). The axis of symmetry 31 of the guide path 21 is preferably perpendicular to the base plate 11.

Figure 4:
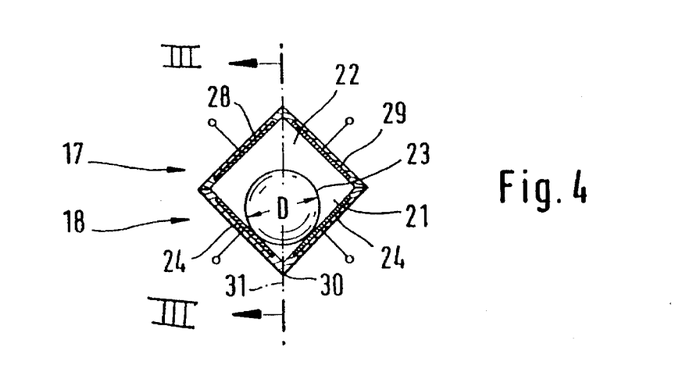
FIG. 4 is a section along line IV—IV through the sensor according to FIG. 3.

In the position shown in FIG. 4, located in the lower path 21 is a ball 23, which forms an inertia body. The diameter D of the ball 23 is dimensioned so that it bears against the planar sidewalls of the guide path 21 at approximately half its height. The ball 23 therefore projects out of the guide path 21.

As shown in the axial section of FIG. 3, embedded in the side wall of the guide path 21 at one end is a contact strip 24, the electrical contact surface of which faces the inside of the guide path 21. The end section of the guide path 21 is closed off by an end wall 32, in which is embedded a contact strip 26 axially limiting the guide path 21 and having a contact surface that likewise faces the guide path 21. In a corresponding manner a contact strip 25 in the side wall at the other end of the guide path 21 and a contact strip 27 in the end wall 32 are provided. The contact strips 24 and 25 extend over a large surface area over approximately one third of the length of the guide path 21 and furthermore have an axial spacing from each other which corresponds to approximately one third of the axial length of the guide path 21.

A contact strip 28 is embedded in the side wall of the second guide path 22 (illustrated in FIG. 3) and extends over a large surface area axially over the entire length of the guide path 22. Its contact surface faces the second guide path 22. A contact strip 29 is embedded into the other sidewall of the guide path 22 in the same way. Contact strips 24 and 25 are embedded correspondingly into the other sidewall of the first guide path 21 so that the contacts are constructed and arranged symmetrically with respect to the axis of symmetry 31.

In the normal position of use of the vacuum cleaning tool, due to its reciprocating movement in the working direction 90 (FIG. 1), the ball 23 forming a conducting inertia body strikes against one or the other end of the guide path 21, respectively. Thus, the ball forms a bridge electrically connecting the respective contacts, due to which the contact pairs 24/26 or 25/27 are alternately closed, i.e., the sensor 18 operates as a switch. The contact pairs are part of a charge transfer circuit for the capacitor C8 of a timing circuit (FIG. 2a), the operation of which will be described in detail hereafter. The capacitor C8 of the timing circuit can be charged via the contact pair 25/27 by a charging capacitor C7, to which a supply voltage can be applied via the second contact pair 24/26.

The guide path 22 with the contacts 28/29 located therein forms a position sensor 17 with the ball 23. If the suction cleaning tool is lifted from the floor and brought into an overhead position, the ball 23 drops out of the guide path 21 into the guide path 22 and closes the contacts 28/29 therein, i.e., the position sensor 17 functions as a switch.

Figures 2, 7:
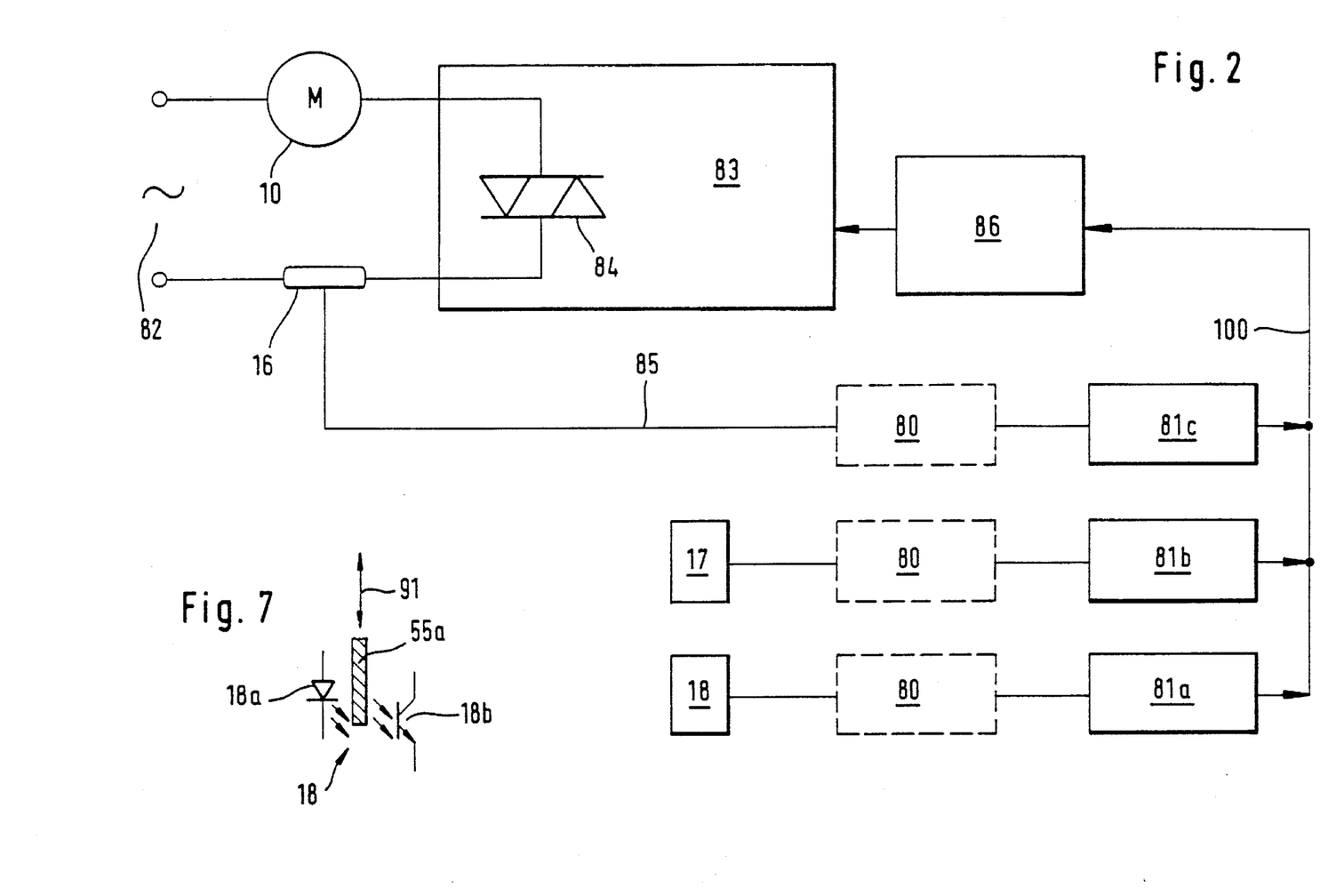
FIG. 2 shows schematically a control circuit for operating an electric motor driving the brush roller.
FIG. 7 is a schematic representation of a further embodiment of a movement sensor.
Figure 3:
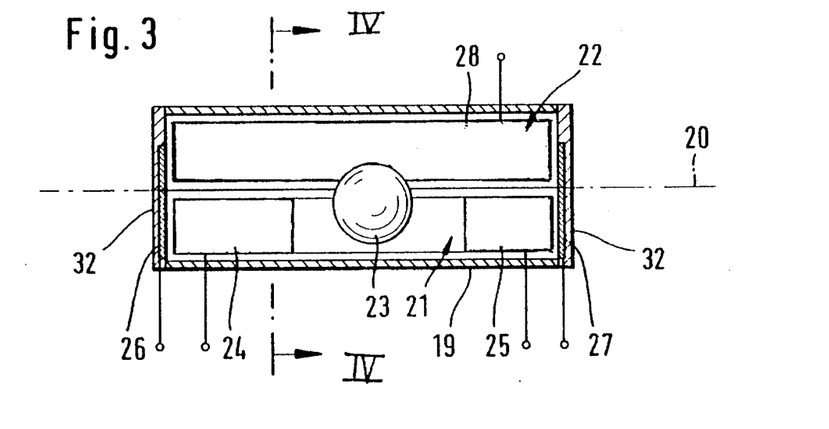
FIG. 3 is a schematic illustration of an electromechanical movement and/or position sensor in axial section along line III—III of FIG. 4.

FIG. 2 is a circuit diagram showing the control circuit for the electric motor 10 provided with several components. The motor is connected to a voltage source (power supply) 82 of, for example, 220 volts. Connected within the circuit of the motor 10 is preferably an electronic circuit component, in the shown embodiment a Triac 84, which is operated according to the principle of a phase-shifting control by a speed regulator 83. The speed regulator 83 can be operated by corresponding wiring as a speed controller or, alternatively, as an ON/OFF switch. A sensor 16 located in the motor circuit detects preferably the motor current, and a corresponding output signal is supplied via a signal lead 85—and, if necessary, a preparation circuit 80—to a recognition circuit 81c. The actual value of the motor current is monitored permanently in the recognition circuit 81c. If the motor current exceeds an admissible, maximum current for a predetermined time, then by way of the output lead 100 and the optoelectronic coupler 86, the speed regulator 83 is activated and lowers the motor current (speed controller function), i.e., preferably blocks the Triac 84 permanently (ON/OFF switch function). Damage to the electric motor 10 due to an overload is thus prevented. Switching-off the electric motor 10 may take place with a time limit, but is preferably permanent. In the latter case, unlocking the protective device is possible solely by disconnecting the vacuum cleaner from the power supply (voltage source).

It may be appropriate to provide the speed regulator 83 with an adjusting member for setting a desired speed of the electric motor 10 or of the brush roller 8 (speed controller function). Depending on a comparison of the actual speed with a pre-set reference (nominal) speed, the Triac 84 of the phase-shifting control is controlled in order to set a current value corresponding to the desired motor speed; the predetermined desired speed is kept approximately constant.

Figure 2A:
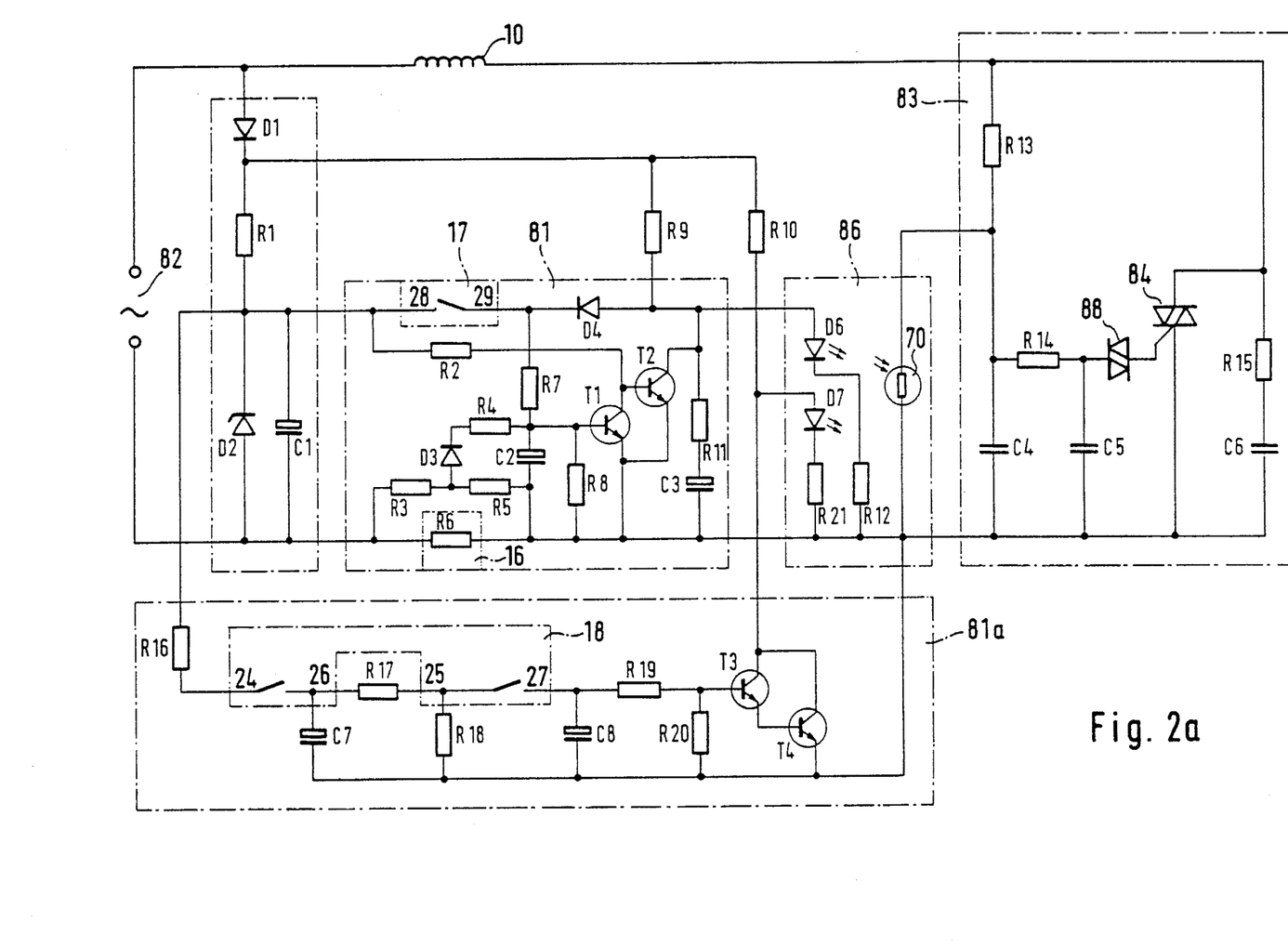
FIG. 2a is a basic circuit diagram of the control circuit according to FIG. 2.

FIG. 2a shows a circuit diagram of the control circuit according to FIG. 2. The motor 10 is connected to the voltage source 82, via the speed regulator 83 which comprises a Triac 84. The control connection of the Triac 84 is connected via a Diac 88, a resistor R14 as well as a resistor R13 to one pole of the voltage source and is connected via a capacitor C5 to the other pole of the voltage source. Connected parallel to the resistor R14 and the capacitor C5 is a capacitor C4, whereby the firing time of the Triac 84 is fixed by the rating of the resistor R13 and of the capacitor C4 (phase-shifting control). The capacitor C4 charges with each half wave of the voltage source 82, whereby on reaching the breakdown voltage of the Diac 88 a short current pulse flows in the control connection, which is sufficient for firing the Triac 84. The serial connection of the resistor R15 and the capacitor C6, parallel to the Triac 84, serve as an excess voltage protection device for the Triac 84 and for suppressing radio interference.

Connected parallel to the capacitor C4 is a photoresistor 70 of an optoelectronic coupler 86, which furthermore comprises two light-emitting diodes (LED) D6 and D7 associated with the photoresistor 70. A protection resistor R12 or R21 is serially connected with each LED.

The LED D7 is controlled by the recognition circuit 81a of the movement sensor 18, whereas the LED D6 is controlled by the common recognition circuit 81 of the load sensor 16 as well as of the position sensor 17.

Connected for supplying the voltage to the recognition circuits 81, 81a is a Zener diode D2, whose voltage is stabilized by a smoothing capacitor C1. Connected serially with the Zener diode D2 is a resistor R1, and an oppositely switched diode D1 is connected to the voltage source 82. For supplying voltage to the LEDs D6 and D7, they are connected by way of series resistors R9 and R10 to the cathode of the diode D1.

The supply voltage tapped from the Zener diode D2 is applied via a resistor R16 to the contact 24 of the movement sensor 18. The contact 26 of the contact pair is grounded via the charging resistor C7 and is connected via a resistor R17 to the contact 25 of the second contact pair of the movement sensor 18. The contact 25 is furthermore grounded via a resistor R18. The contact 27 of the second contact pair is furthermore grounded via the capacitor C8 and a serial connection consisting of the resistors R19 and R20. The potential present between the resistors R19 and R20 controls a transistor circuit T3/T4 with which the anode of the LED D7 is grounded.

If the vacuum cleaning tool is moved to and fro in the working direction 90 (FIG. 1), the capacitors C7 and C8 are charged; due to the potential resulting at the potential point between the resistors R19 and R20, the transistors T3 and T4 are connected through, so that the anode of the LED D7 is connected to ground. No light shines on the photoresistor 70, so that the speed regulator 83 operates in accordance with the specifications of the components R13 and C4.

If the working movement is suspended, then one or both contact pairs remain open, so that the capacitors discharge via the resistors R17/R18 or R19 and the transistor T3, due to which the transistor circuit T3/T4 blocks. A current now flows via the LED D7, so that light shines on the photoresistor and its resistance becomes low. The capacitor C4 is thus essentially short-circuited, so that the breakdown voltage of the Diac 88 can no longer be reached and the Triac 84 is blocked permanently. The electric motor 10 is switched off. When the working movement is resumed, the capacitors C7 and C8 are again charged, for which reason the transistor stage T3/T4 is connected through and the LED D7 is turned off; the photoresistor 70 becomes highly resistive, so that the Triac 84 is again fired and the electric motor 10 is thus restarted.

The load sensor 16 is formed by a resistor R6 connected in the motor circuit. The voltage decreasing at the resistor R6 in proportion to the motor current is supplied via a voltage divider R3/R5 via a rectifier diode D3 and a protective resistor R4 to a switching transistor T1. In this case, due to a capacitor C2 between the resistor R4 and ground, it is ensured that brief current variations do not lead to premature switching-off of the electric motor 10. A discharge resistor R8 is connected parallel to the capacitor C2.

The working point of the transistor T1 is determined by the resistors R7 and R8; the voltage tapped by way of the voltage divider R3/R5 shifts the working point of the transistor so that, at a certain motor current, the transistor T1 becomes conductive thereby blocking the transistor T2. When the transistor T2 blocks, a current flows through the LED D6, so that light is emitted onto the photoresistor 70 which becomes low resistive, so that the Triac 84 can no longer fire and the electric motor 10 is switched off. The anode of the LED D6 is connected to ground via a charging resistor R11 and the capacitor C3, so that the switching state is maintained even after switching off the electric motor 10. Only when the supply voltage 82 is interrupted and the capacitors have discharged, a re-starting of the electric motor 10 is possible.

Furthermore, the recognition circuit 81 evaluates the signal from the position sensor 17. Its one contact 28 is connected to the cathode of the Zener diode D2, whereas the contact 29 is connected via the resistor R7 to the capacitor C2. When the contact pair 28/29 is switched on, the working point of the transistor T1 is shifted so that it becomes conductive and the transistor T2 blocks. The LED D6 emits light, the photoresistor 70 acquires low impedance, and the Triac 84 no longer fires. The electric motor 10 is stopped. Again, this condition can only be cancelled by disconnecting the circuit from the supply voltage 82.

Figure 5:
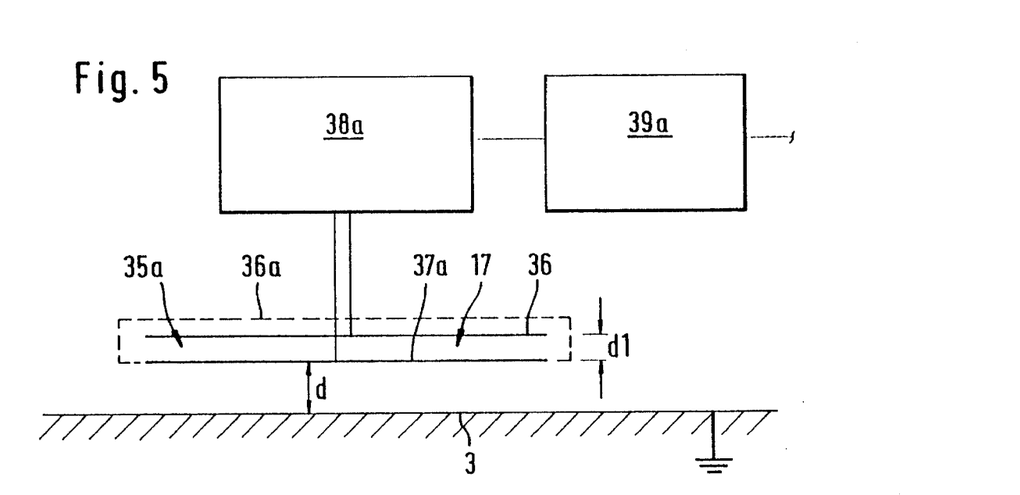
FIG. 5 shows diagrammatically a capacitive position sensor.

In FIG. 5, a position sensor 17 constructed as a capacitive sensor is illustrated schematically. It is ;formed from a plate capacitor 35a having a cathode plate 37a that is constructred to be areal, in particular rectangular. The anode of the plate capacitor is formed by the floor 3. The field of the capacitor 35a is as wide as possible and focused: it is wide in order to achieve a great penetration depth into the floor, so that with a cleaning tool resting on the floor, a large ϵ may act over a large field length resulting in a great capacitance ($C=\epsilon \times A/d$); and focused in order to limit misfunctions. For the purpose of shielding, an active shield 36 as well as a housing 36a at ground potential are provided. A printed circuit board is located in the space d1 between the active screen 36 and the cathode 37a. This capacitive sensor 17 is part of an oscillator 38a which is located as a measuring capacitance in the feedback branch. If the capacitance changes, for example, due to change of the dielectric constant, the oscillator is detuned. This detuning is evaluated as an analog signal by a threshold value switch, whereby the respective condition of the threshold value switch (ON/OFF) indicates the condition detected.

Figure 6:
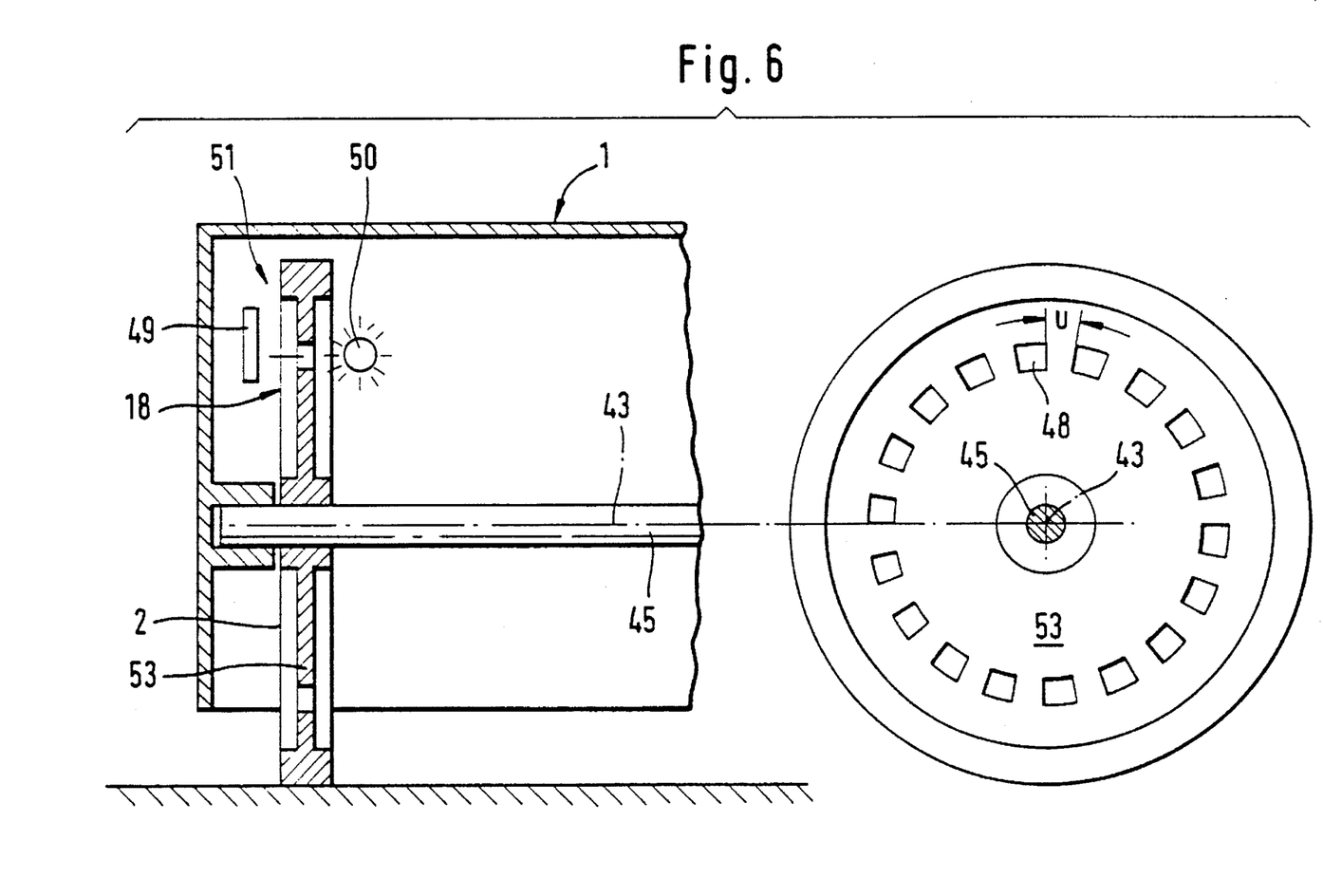
FIG. 6 shows in section another embodiment of an electromechanical movement sensor.

In the embodiment according to FIG. 6, a mechanical/electrical movement sensor 18 is illustrated, which is located on a caster 2 of the brush suction nozzle 1. At the time of a movement of the brush suction nozzle 1 in the working direction 90 (FIG. 1), the caster 2 rotates about the axis 43 of the shaft 45. According to FIG. 6, this rotary movement of the caster 2 is detected by a fork light barrier 51. A series of individual openings 48 is provided in the support disk 53 of the castor 2, positioned in the peripheral direction with a spacing u, so that at the time of a rotation of the castor 2, the fork light barrier 51 is repeatedly interrupted by the webs between two openings 48. The light from a light source 50 impinges through the openings 48 repeatedly onto the receiver 54, which emits a corresponding sequence of pulses. This sequence is supplied—optionally via a preparation circuit 80 (FIG. 2)—to the recognition circuit 81a, which is able to deduce from an impulse sequence that the brush suction nozzle 1 is moving. If the receiver 49 emits no impulse sequence, the brush suction nozzle 1 is stationary or is lifted off the floor. In both cases, the motor 10 is stopped by the recognition circuit 81a. This preferably takes place via a timing circuit integrated in the recognition circuit, which timing circuit initiates the switching-off only after the expiration of a predetermined time interval of, for example, 2 to 6 seconds. Short interruptions of the working movements thus cannot lead to switching-off of the motor.

FIG. 7 shows a movement sensor 18 of another type. A wall portion 55a of the pivot joint 55 (FIG. 1) of the connection socket 13 lies in a fork light barrier and interrupts the light path from a light source 18a to a receiver 18b. The movement of the brush suction nozzle 1 in the working direction 90 (FIG. 1) leads to a repetitive tilting movement of the connection socket 13 about the swivel axis 56 (FIG. 1), due to which a repeated relative movement occurs between the casing 6 and the pivot joint 55 of the joint 57. The transmitter 18a and the receiver 18b (FIG. 7) of the movement sensor 18 are integral with the casing, so that, on account of the tilting movement, the wall portion 55a of the pivot joint 55 is moved in the direction of arrow 91 relative to the fork light barrier. The portion 55a thus repeatedly interrupts the light path of the fork light barrier. The irregulr impulse sequence, which can accordingly be tapped at the receiver 18b, is amplified in the preparation circuit 80 (FIG. 2) and, for example, controls a timing circuit which can be retriggered and is integrated in the recognition circuit 81a. Each time an impulse occurs, the timing circuit is restarted, so that, when the working movement in the direction of arrow 90 continues, the excited timing circuit permanently indicates this movement.

If the brush suction nozzle 1 remains at one point for a predetermined period of time which is greater than the time keyed into the timing circuit, the timing circuit drops off as a result of a lack of impulses. The recognition circuit 81a then intervenes via the output lead 100 and the optoelectronic coupler 86 of the speed regulator 83 (FIG. 2). Mechanical damage, which may occur due to an excessively long action time of the rotating brush roller 8, is thus avoided on textile floor coverings, when the brush suction nozzle is stationary. On the other hand, the absence of an impulse sequence is also an indication of a raised brush suction nozzle 1, so that the initiated switching-off is also able to prevent injury that may be caused by the rotating brush roller 8.

Figure 8:
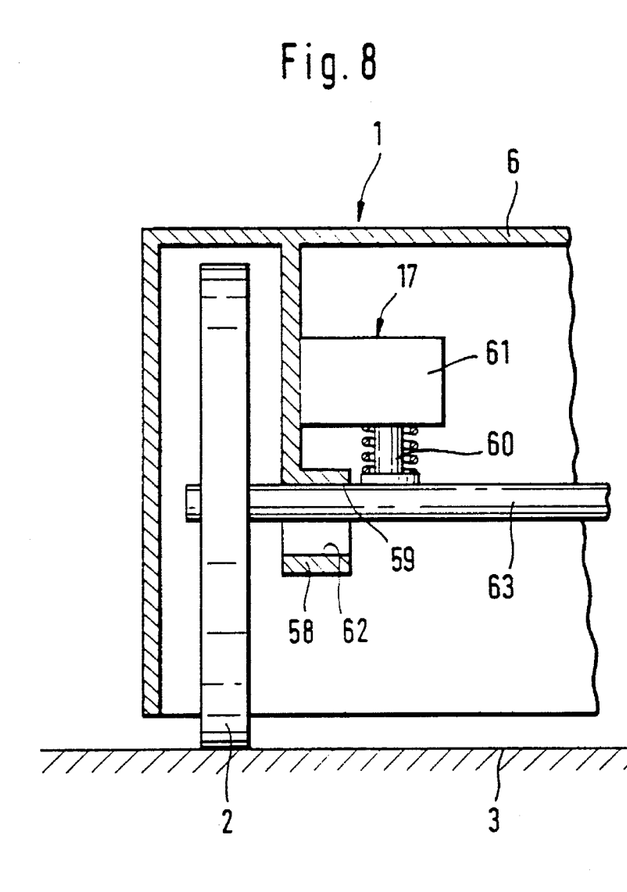
FIG. 8 is a partial section through a vacuum cleaner with an electromechanical position sensor.
Figure 9:
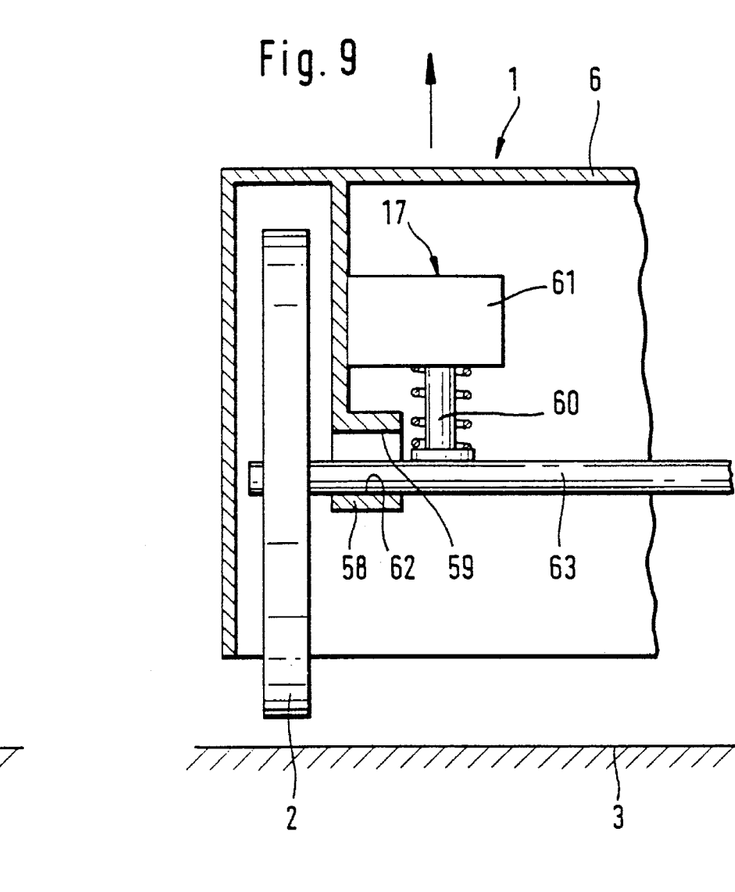
FIG. 9 is an illustration according to FIG. 8 with the position sensor relieved of load.

FIGS. 8 and 9 show a further embodiment of a position sensor 17, which according to FIG. 2 is connected via a preparation circuit 80 to the recognition circuit 81b. The position sensor 17 consists of a microswitch 61 integral with the casing, whereof the spring-loaded switching pin 60 bears against the shaft 63 of a scanning wheel, preferably the caster 2 of the brush suction nozzle 1. The shaft 63 is mounted in a bearing 58 that is integral with the casing and constructed as a vertical slot. The slot has a width corresponding to the diameter of the shaft 63, so that the shaft 63 is stationary in the horizontal direction within the bearing 58, but is slidable vertically. When the brush suction nozzle 1 rests on the floor 3, the shaft 63 is slid against the upper end 59 of the slot, whereby in this position the switching pin 60 is depressed and the microswitch 61 actuates an electrical switching contact. The recognition circuit 81b (FIG. 2) recognizes that the brush suction nozzle 1 is resting on the floor 3. The motor 10 (FIG. 2) is in operation.

If, as shown in FIG. 9, the brush suction nozzle 1 is raised in the direction of the arrow off the floor 3, the shaft 63 moves in the slot-like bearing 58 as far as the lower end 62 of the slot, due to which the switching pin 60 is disengaged and the switching contact of the microswitch is actuated accordingly. The recognition circuit 81b (FIG. 2) records the raising of the brush suction nozzle 1 off the floor and actuates via the output lead 100 and the optoelectronic coupler 86 the speed regulator 83 for switching off the motor 10.

The control circuit according to FIG. 2 advantageously comprises means for preventing reconnection, so that switching-off of the motor initiated by the immobility or lifting of the brush suction nozzle 1 can only be cancelled by manual switching for the sake of safety of the operator, for example, by disconnecting the vacuum cleaner from the power supply.

Figure 10:
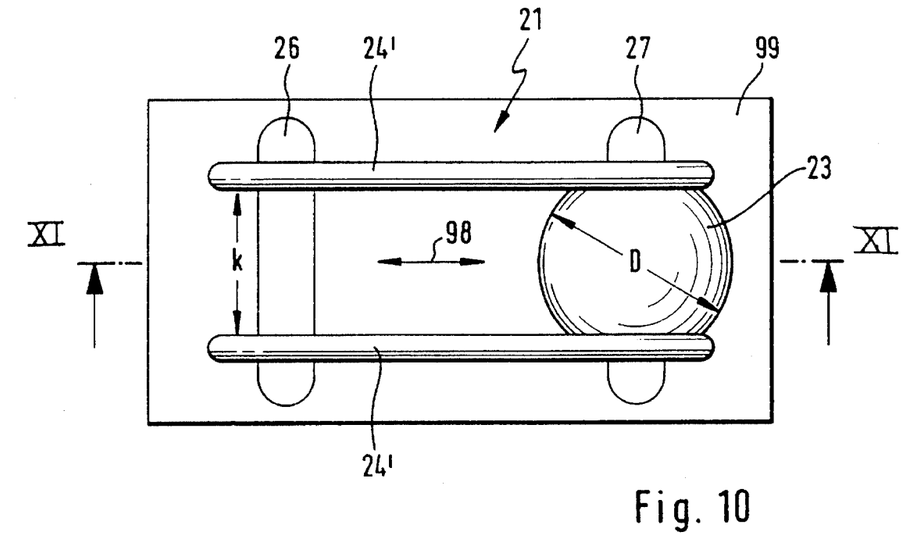
FIG. 10 is a plan view of a further embodiment of an electromechanical movement switch.
Figure 11:
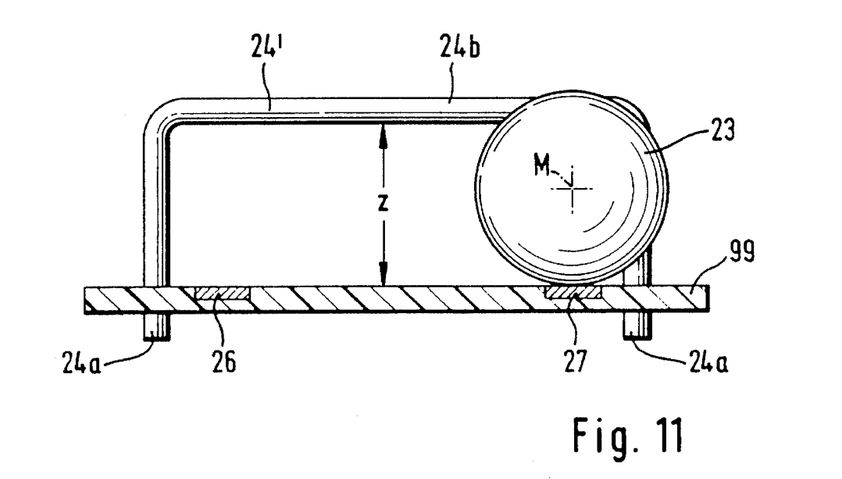
FIG. 11 is a section along line XI—XI in FIG. 10.

The movement sensor (switch) represented in FIGS. 10 and 11 is comprised of a support 99 to which two U-shaped contact wires 24' are fastened. The U-shaped contact wires 24' are fastened with the free ends 24a of their legs within the support 99 whereby the stay 24b is positioned substantially parallel to the support 99 at a distance z. Both contact wires, as shown in FIG. 10, are parallel to one another spaced at a distance k so that a cage for the ball 23 is formed between the contact wires 24'. The diameter D of the ball is greater than the lateral distance k of the contact wires 24' to one another. The ball 23 is positioned with play between the contact wires 24' so that it is movable in the direction of arrow 98. Its movement is limited by the legs 24a. In the area of the legs 24a a contact strip 26, 27 is arranged at the support 99 whereby upon resting of the ball 23 at the legs 24a the center of the ball M is above the contact strips 26, 27.

Upon movement of the support 99 in the direction of arrow 98 the electrically conductive ball 23 will connect at the axial end of the guide path 21 the bare electrical contact wires 24' with the contact strips 26, 27 so that an electrical switch is formed. The movement switch according to FIGS. 10 and 11 is used in the same manner as the movement sensor of FIGS. 3 and 4.

The present invention is, of course, in no way restricted to the specific disclosure of the specification and drawings, but also encompasses any modifications within the scope of the appended claims.

What I claim is:

1. A vacuum cleaning tool for connecting to a suction tube of a vacuum cleaning device, said tool comprising:

a casing with a bottom plate facing a floor surface to be cleaned;

a brush chamber enclosed within said casing;

a brush roller having bristles and being rotatably supported within said brush chamber;

an electric motor for rotatably driving said brush roller;

said bottom plate having a suction opening;

said bristles of said brush roller extending through said suction opening;

a speed regulator connected to said electric motor;

a movement sensor for sensing movement of said vacuum cleaning tool across a floor;

a first recognition circuit connected between said movement sensor and said speed regulator for recognizing signals emitted by said movement sensor derived from movement of said vacuum cleaning tool across the floor and sending switching signals derived from the signals emitted by said movement sensor to said speed regulator; and wherein said speed regulator switches on and off said electric motor based on said switching signals.

2. A tool according to claim 1, further comprising a position sensor for sensing whether said vacuum cleaning tool is positioned on the floor and a second recognition circuit, said position sensor connected via said second recognition circuit to said speed regulator, wherein said second recognition sensor, when recognizing a lifting of said vacuum cleaning tool off the floor, actuates said speed regulator for switching off said motor.

3. A tool according to claim 2, wherein said movement sensor and said position sensor are electromechanical sensors.

4. A tool according to claim 3, wherein each one of said electromechanical sensors is comprised of at least one electric contact switched by a movable inertia body.

5. A tool according to claim 4, wherein each one of said electromechanical sensors has a first guide path with two end sections for said inertia body and wherein said at least one electric contact is arranged at one said end section of said first guide path.

6. A tool according to claim 2, further comprising:

a third recognition circuit;

a load sensor; and wherein said speed regulator is connected via said third recognition circuit to said load sensor.

7. A tool according to claim 6, wherein said load sensor is connected within a circuit of said electric motor.

8. A tool according to claim 7, wherein said load sensor is a resistor.

9. A tool according to claim 2, further comprising a load sensor, wherein said load sensor and said position sensor are both connected to said second recognition circuit.

* * * * *